(12) United States Patent
Pu et al.

(10) Patent No.: US 8,625,266 B2
(45) Date of Patent: Jan. 7, 2014

(54) LAPTOP COMPUTER

(75) Inventors: Hong-Liang Pu, Shenzhen (CN); Yong-Feng Zhao, Shenzhen (CN); Fu Liao, Shenzhen (CN); Yong-Jun Gu, Shenzhen (CN); Ren-Qian Liu, Shenzhen (CN); Ming-Chang Lee, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 159 days.

(21) Appl. No.: 13/420,549

(22) Filed: Mar. 14, 2012

(65) Prior Publication Data

US 2013/0021736 A1  Jan. 24, 2013

(30) Foreign Application Priority Data

Jul. 18, 2011 (CN) .......................... 2011 1 0200080

(51) Int. Cl.
  *G06F 1/16* (2006.01)
(52) U.S. Cl.
  USPC ................. 361/679.26; 345/169; 248/225.11; 365/185.05
(58) Field of Classification Search
  USPC ............. 365/185.05, 185.14, 185.19, 185.28; 248/223.31, 225.11, 316.1, 500, 533; 455/67.11, 466, 456.3, 130, 41.3; 345/205, 212, 158, 168, 173, 211, 213, 345/659, 104, 169; 349/43, 37, 58; 361/679.26, 679.27, 679.09, 679.4, 361/679.55, 679.41, 679.06, 679.28, 361/679.02, 679.04, 679.3, 679.23, 679.24, 361/679.46, 679.08
See application file for complete search history.

(56) References Cited

U.S. PATENT DOCUMENTS 6,490,154 B2 * 12/2002 Thompson ............... 361/679.41
6,903,927 B2 *  6/2005 Anlauff .................... 361/679.28
6,961,046 B2 * 11/2005 Bowden et al. ............... 345/104

* cited by examiner

*Primary Examiner* — Hung Duong
(74) *Attorney, Agent, or Firm* — Altis Law Group, Inc.

(57) ABSTRACT

A laptop computer includes a main body, a display, a component, and a frame. The main body includes a front end, a back end opposite to the front end, a left side surface and a right side surface connected between the front end and the back end, and a socket positioned at the back end. The display is pivoted to the front end of the main body. The component is detachably inserted into the socket. The frame is movably connected to the left side surface and the right side surface. The frame is able to rotate between a locked position and an unlocked position, when the frame is at the locked position, the frame keeps the component in the socket, and when the frame is at the unlocked position, the component is able to be pulled out from the socket.

10 Claims, 6 Drawing Sheets

LAPTOP COMPUTER

BACKGROUND

1. Technical Field

The present disclosure relates to laptop computers, particularly to a detachable laptop computer.

2. Description of Related Art

A laptop computer may include an optical disk drive. Yet, sometimes the optical disk drive is useless to a user, but cannot be removed from the laptop computer and makes the laptop unnecessarily heavy.

What is needed, therefore, is a laptop computer which could overcome the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
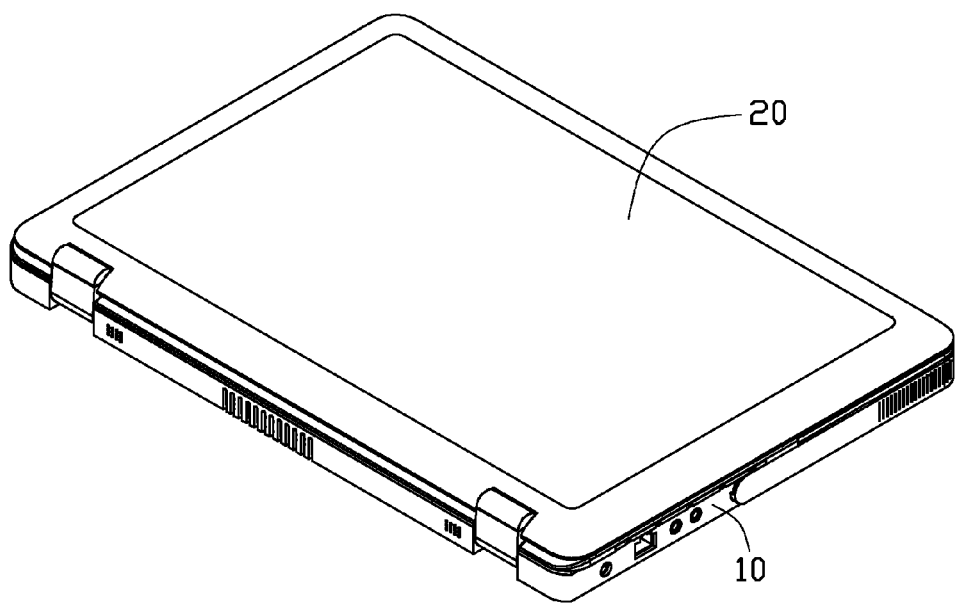
FIG. 1 is a schematic, isometric view of a laptop computer according to an embodiment, the laptop computer including a main body and a display.
Figure 2:
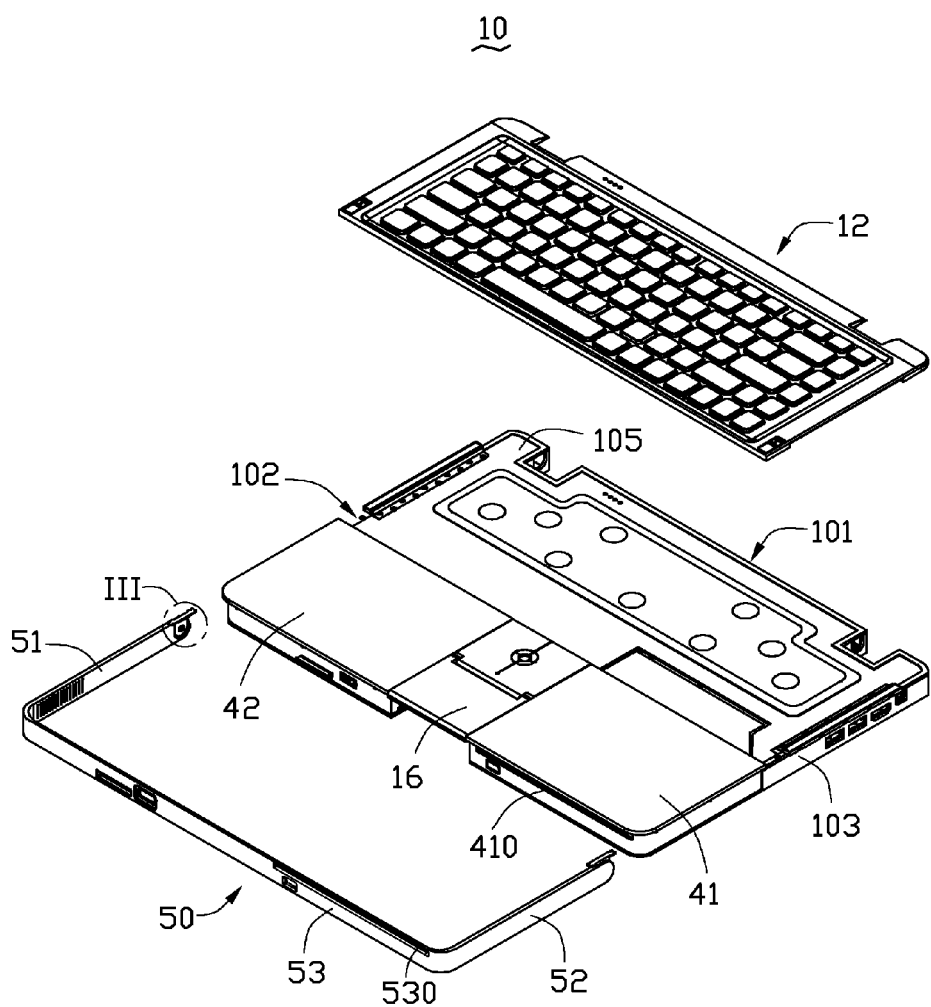
FIG. 2 is an exploded view of the main body of FIG. 1.
Figure 3:
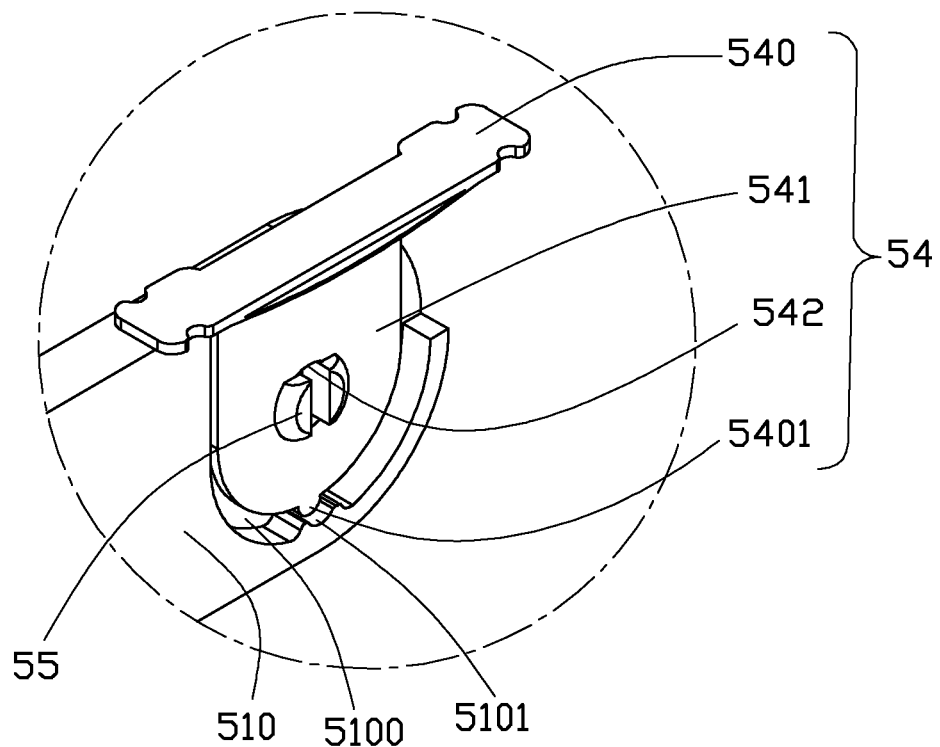
FIG. 3 is an enlarged view of a circled part III of FIG. 2, including an elastic connecting piece.

Referring to FIGS. 1 to 6, a laptop computer 100 according to an embodiment is disclosed. The laptop computer 100 includes a main body 10 and a display 20. The main body 10 includes a front end 101, a left side surface 102, a right side surface 103, and a back end 104. The display 20 is pivoted to the main body 10 at the front end 101.

The laptop computer 100 further includes an optical disk drive 41, an independent graphic card 42, and a touch unit 16. The optical disk drive 41, the independent graphic card 42, and the touch unit 16 are detachably mounted on the back end 104.

The main body 10 further includes a top surface 105. A keyboard 12 is mounted on the top surface 105.

The laptop computer 100 further includes a frame 50. The frame 50 includes a first side strip 51, a second side strip 52 opposite to the first side strip 51, and a connecting strip 53 substantially perpendicularly connected to the first and second side strips 51, 52. The connecting strip 53 further defines a slot 530 corresponding to the optical disk drive 41.

The first side strip 51 is similar to the second side strip 52 in structure. The first side strip 51 includes an end 510. The end 510 defines a depression 5100. The depression 5100 is substantially U-shaped, but includes a projected part defining a locking groove 5101. The main body 10 further includes two elastic connecting pieces 54. Each elastic connecting piece 54 includes a fixing part 540 mounted on the top surface 105 of the main body 10, and a U-shaped part 541 extending from the fixing part 540 and received in the depression 5100.

A pair of spaced shafts 55 fixed on the end 510 extend towards each other through a hole 542 defined in the U-shaped part 541, to rotatably connect the end 510 to the connecting piece 54. The distal ends of the shafts 55 terminate in two deformable latches arranged back-to-back which re-expand after insertion to resist on the U-shaped part 541, for keeping the connecting piece 54 and the end 510 together. The U-shaped part 541 includes a locking projection 5401 corresponding to the locking groove 5101. The second side strip 52 is connected to the right side surface 103 by a similar structure. The frame 50 is rotatable around the pair of shafts 55. The frame 50 is also movable along the extending direction of the first side strip 51 in a limited range by pulling the frame 50 and making the spaced shafts 55 deform. The locking projection 5401 engages with the locking groove 5101, for keeping the frame 50 at a locked position where the first side strip 51 overlaps with the left side surface 102 when no rotation force is applied to the frame 50, as shown in FIG. 1.

A base board 107 extends from the back end 104. A first socket 108, a second socket 109, and a third socket 110 are respectively mounted on the base board 107. The optical disk drive 41, the touch unit 16, and the independent graphic card 42 are respectively inserted into the first socket 108, the second socket 109, and the third socket 110 for mechanically and electrically being connected to the main body 10. The optical disk drive 41 includes an L-shaped hooking part 412 away from the main body 10. The hooking part 412 includes an outer surface 4120 and a projected strip 4121 formed on the outer surface 4120. When at the locked position, the frame 50 resists on the outer surface 4120 to maintain the connection between the optical disk drive 41 and the main body 10, and resists on the projected strip 4121 to support the optical disk drive 41. The touch unit 16 and the independent graphic card 42 engage with the frame 50 by similar means.

Figure 4:
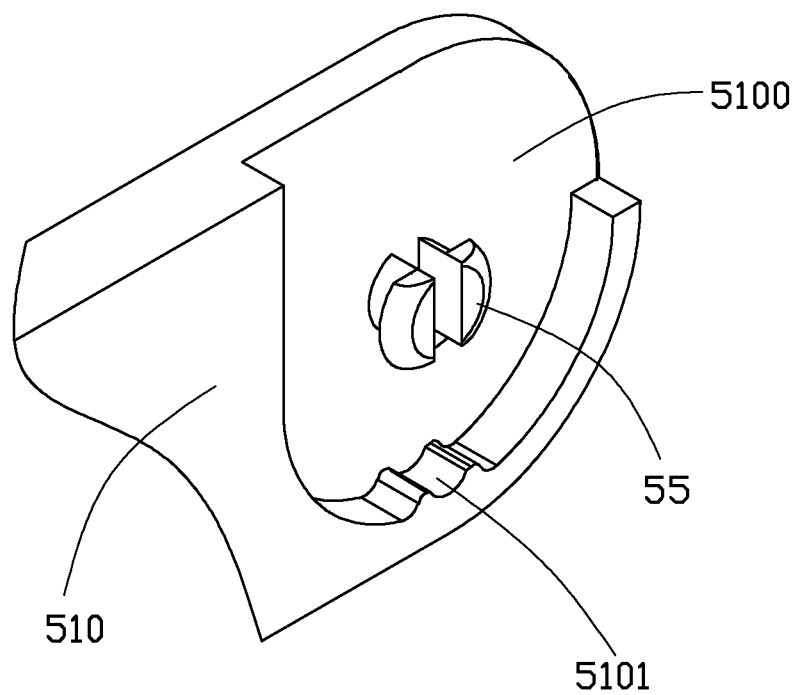
FIG. 4 is similar to FIG. 3, but with the elastic connecting piece removed.
Figure 5:
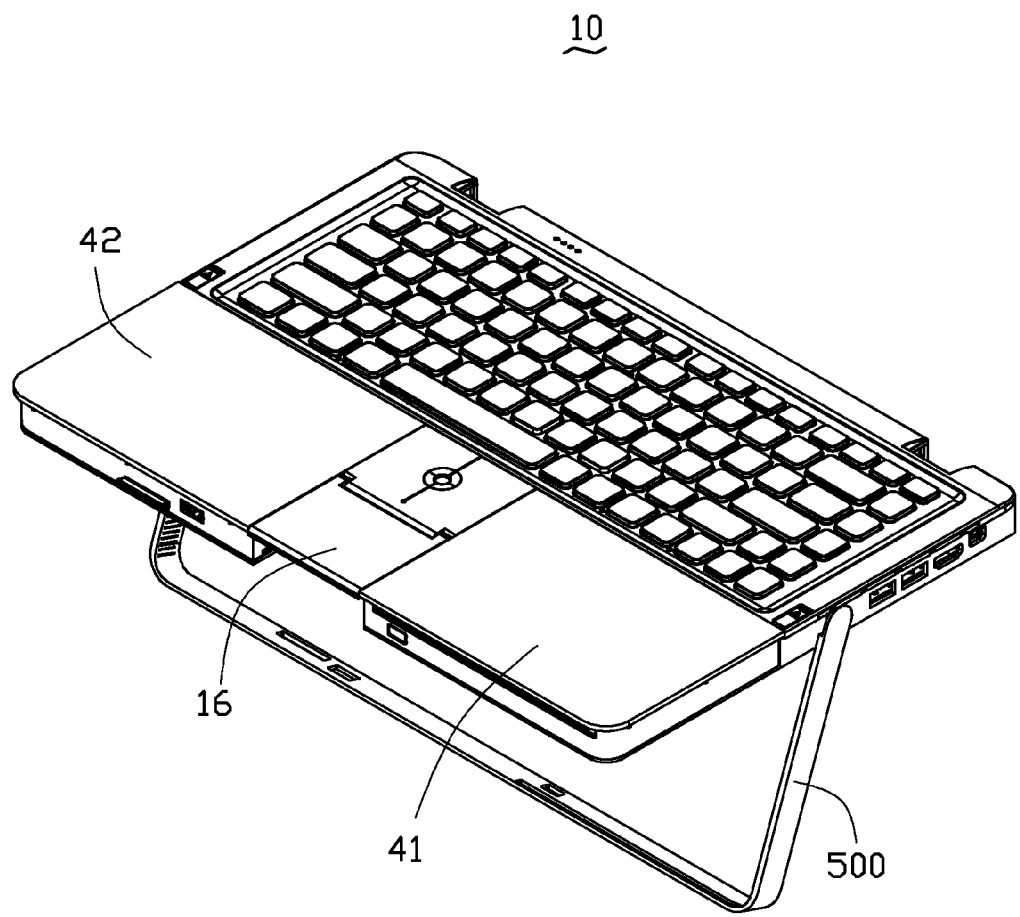
FIG. 5 is a schematic, isometric view of the main body of FIG. 1.
Figure 6:
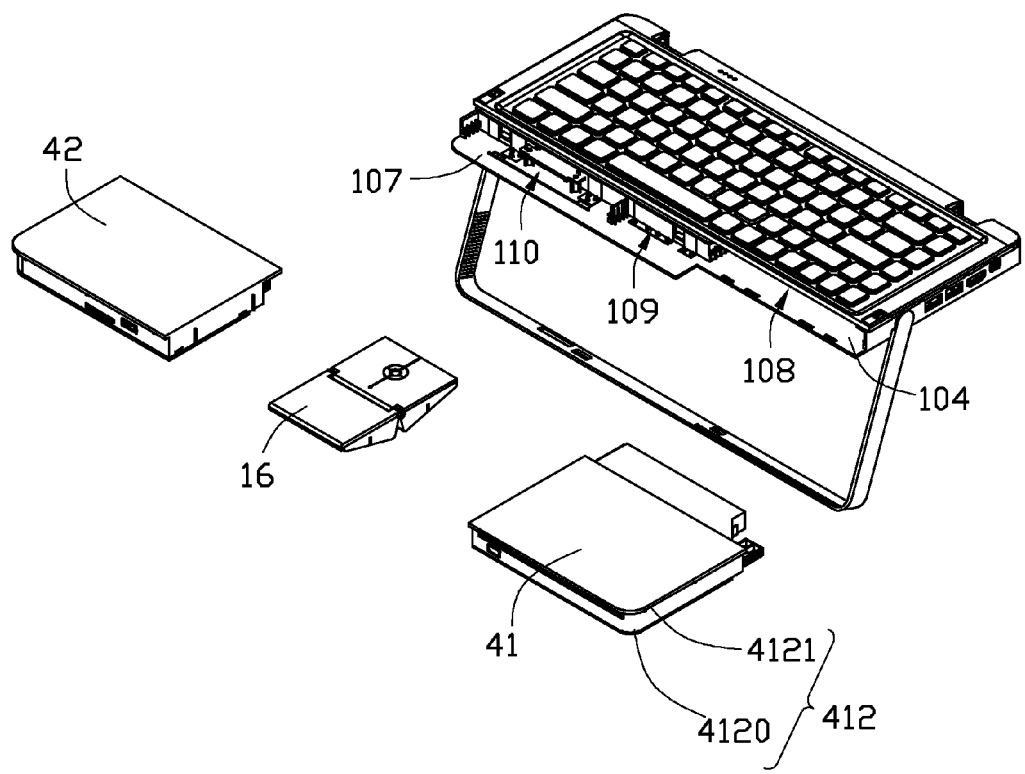
FIG. 6 is another exploded view of the main body of FIG. 1.

To disassemble, the frame 50 is pulled to leave the hooking part 412, then rotated to an unlocked position as shown in FIG. 4, and the optical disk drive 41, the touch unit 16, and the independent graphic card 42 can easily be disengaged from the main body 10.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A laptop computer, comprising:
    a main body comprising a front end, a back end opposite to the front end, a left side surface and a right side surface, both the left and right side surfaces being connected between the front end and the back end, the main body comprising a socket positioned at the back end;
    a display pivoted to the front end of the main body;
    a component detachably inserted into the socket; and
    a frame movably connected to the left side surface and the right side surface respectively, wherein the frame is able to rotate between a locked position and an unlocked position, when the frame is at the locked position, the frame keeps the component in the socket, and when the frame is at the unlocked position, the component is able to be pulled out from the socket.

2. The laptop computer of claim 1, wherein the component is one selected from the group consisting of an optical disk drive, a touch unit, and an independent graphic card.

3. The laptop computer of claim 1, wherein the component comprises a hooking part engaging with the frame.

4. The laptop computer of claim 3, wherein the hooking part comprises an outer surface and a projected strip positioned on the outer surface, and the frame resists on the outer surface and supports the projected strip when the frame is at the locked position.

5. The laptop computer of claim 1, wherein the main body further comprises a base board extending from the back end and the socket is mounted on the base board.

6. The laptop computer of claim 1, wherein the frame comprises two side strips connected to the left side surface and the right side surface respectively and a connecting strip connected between the two side strips.

7. The laptop computer of claim 6, wherein each side strip further comprises a pair of spaced shafts, the laptop computer further comprises two elastic connecting pieces fixed on the left side surface and the right side surface respectively, each elastic connecting piece defines a hole, the pair of spaced shaft extends through the hole.

8. The laptop computer of claim 7, wherein each side strip defines a locking groove, each elastic connecting piece comprises a locking projection engaging with the locking groove.

9. The laptop computer of claim 8, wherein each side strip comprises a distal end, the distal end defines a substantially U-shaped depression facing a respective one of the left side surface and the right side surface, and the depression communicates with the locking groove; each elastic connecting piece comprises a fixing part mounted on the main body and a U-shaped part extending from the fixing part, the U-shaped part is received in the depression, and the locking projection is positioned on the U-shaped part.

10. The laptop computer of claim 9, wherein the pair of spaced shafts is positioned on the distal end of each side strip and extends from a bottom surface of the depression towards a respective one of the left side surface and the right side surface, the distal ends of the pair of spaced shafts terminate in two latches which are arranged back-to-back and pass through the hole.

* * * * *